United States Patent [19]
Keledy

[11] 3,739,376
[45] June 12, 1973

[54] REMOTE MONITOR AND INDICATING SYSTEM

[75] Inventor: Francis C. Keledy, Butler, N.J.

[73] Assignee: Trodyne Corporation, Teterboro, N.J.

[22] Filed: Oct. 12, 1970

[21] Appl. No.: 79,797

[52] U.S. Cl.......... 340/416, 244/17.11, 250/231 R, 340/27 R, 340/195, 340/224, 340/267 R, 343/6.5 SS
[51] Int. Cl. ............................................. G08b 1/08
[58] Field of Search........... 340/224, 258 R, 258 C, 340/58, 152 T, 282, 267 R, 271, 27 R, 421, 795, 416; 343/18 R, 18 A, 6.5 SS; 244/17.11; 250/231 R

[56] References Cited
UNITED STATES PATENTS

| | | | |
|---|---|---|---|
| 2,673,292 | 3/1954 | Treharne | 340/258 R X |
| 3,092,806 | 6/1963 | Field | 340/58 |
| 3,249,916 | 5/1966 | Quinn | 340/258 R X |
| 2,921,289 | 1/1960 | Eklund et al | 340/27 R |
| 2,806,402 | 9/1957 | Ferris | 340/27 R X |
| 3,913,700 | 11/1959 | Brody | 244/17.11 X |
| 2,918,671 | 12/1959 | Halpern | 343/18 R |
| 3,036,295 | 5/1962 | Kleist | 340/152 T X |
| 3,427,614 | 2/1969 | Vinding | 340/258 R X |

FOREIGN PATENTS OR APPLICATIONS 1,206,925  9/1970  Great Britain.................. 343/6.5 SS Primary Examiner—David L. Trafton
Attorney—Sandoe, Hopgood and Calimafde

[57] ABSTRACT

A passive parameter-sensing element is disposed at a location remote from an indicator. Upon the occurrence of a predetermined variation in the sensed parameter, an active unit coupled to the passive element produces a signal which operates the indicator. In one embodiment of the invention a plurality of passive sensing elements are housed in the blades of a helicopter. Upon the sensing of a change in the air pressure in one of the blades, the response of the passive element in that blade causes the active unit to produce a signal which has a characteristic uniquely associated with the particular blade in which the failure occurs.

11 Claims, 6 Drawing Figures

Patented June 12, 1973
3,739,376
2 Sheets-Sheet 1
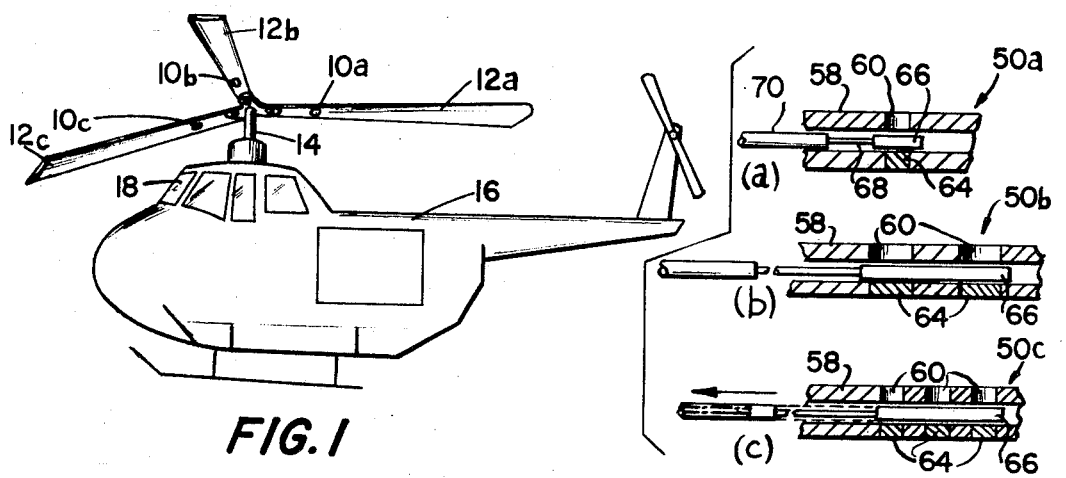
FIG.1
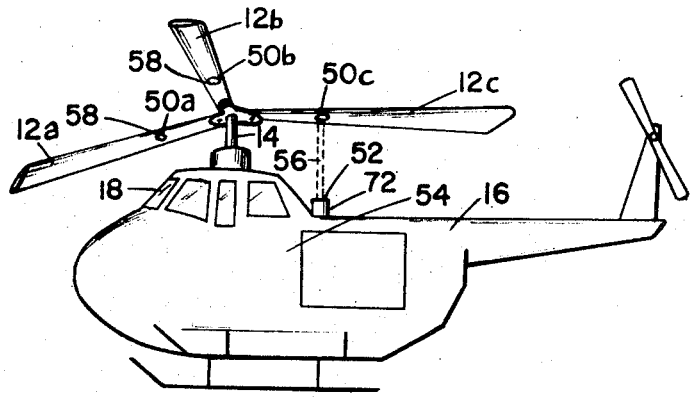
FIG. 3
FIG.4
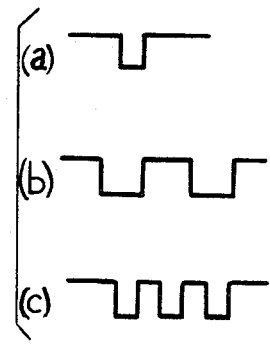
FIG. 5
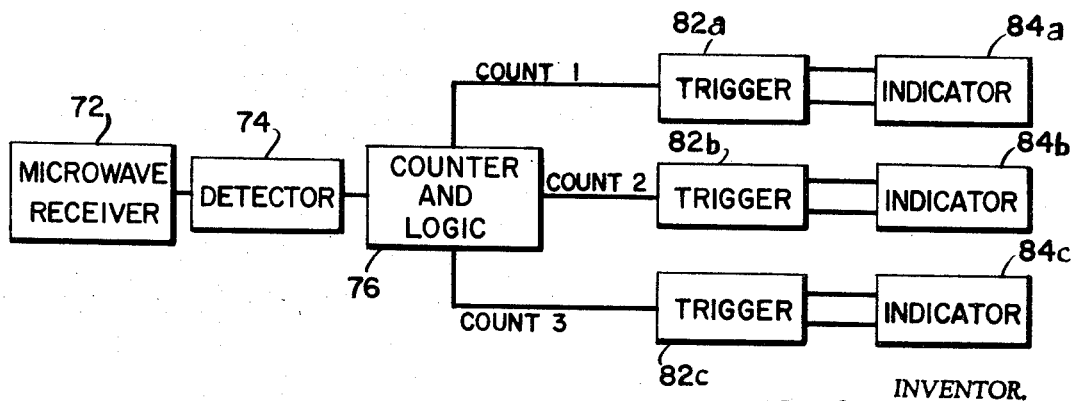
FIG.6
INVENTOR.
FRANCIS C. KELEDY
BY
Sandoe, Hopgood & Calimafde
ATTORNEYS

REMOTE MONITOR AND INDICATING SYSTEM

The present invention relates generally to parameter monitoring systems, and more particularly to a remote parameter monitoring and indicating system by means of which a fault at an inaccessible location can be quickly sensed and identified at a station remote from the occurrence of the fault.

In many applications it is essential that a selected parameter, such as pressure, temperature or the like, at an inaccessible location be continuously monitored. Usually, in such applications, it is also essential that a warning be quickly and unambiguously provided at the indicator wherever the monitored parameter has varied beyond a preselected threshold level. The problem of remote monitoring becomes more complex in situations wherein it is impractical to provide electrical power to the inaccessible location. This is further complicated where an indication of the specific locations of the change in the parameter is required.

A typical application of this type, and one in which the present invention will, for purposes of example, be illustrated, is in a helicopter in which the structural integrity of the blade is to be continuously monitored. It has been found that a developing crack in the wall of the blade spar, if not quickly detected, will inevitably lead to serious damage to the blade structure, and may cause the aircraft to crash. It is thus considered highly desirable if not essential to be able to detect a developing crack in the blade long before the crack has had the opportunity to reach such catastrophic proportions, to thereby permit timely blade repair or replacement.

For these reasons, helicopters are frequently provided with various types of pre-flight and post-flight blade structural integrity monitoring systems. In such systems, the blade spar is hollow and a calibrated pressure or vacuum is sealed in the blade cavity. In many of the known monitoring system, a differential sensing visual indicator, such as that disclosed in U.S. Pat. No. 3,417,727, is incorporated into the blade system. When a developing crack or fissure in the wall of the blade occurs, the pressure in the cavity is altered, the change in pressure is sensed, and an indicator is thereupon actuated to produce a visual indication.

While devices of this type have been found to be highly reliable in sensing and indicating the existence of a developing crack, there are certain limitations to their usefulness since they can only be effectively inspected when the aircraft is on the ground and the rotor blades are not in motion. However, with the longer duration of helicopter flights in recent years resulting from innovations such as in-flight and carrier deck non-stop refueling, it has become increasingly important to be able to detect the development of blade cracks while the helicopter is still in flight. Moreover, such detection should preferably be directly and continuously available to the pilot in the cockpit of the aircraft.

Heretofore, such cockpit monitoring of blade structure integrity has been impractical due to the difficulty in providing reliable electrical power to a unit located in the rotating blades. As a result there is, at the present time, no commercially available, remote blade monitoring system despite the apparent and long-felt need for such a system.

Another possible application of this type of monitoring system as herein described is in an aircraft or truck wherein the tires are arranged in a multiple-tire arrangement. In this arrangement, when one of the tires loses pressure, the load of the vehicle is shifted to the other tire, or tires, in the group. If this loss of pressure goes unnoticed for a sufficient period of time, and the truck travels at full capacity and at high speed, the other tires may become overloaded beyond their capacity. This may result in a dangerous failure of the tire.

It is thus an object of the invention to provide a remote physical parameter monitoring system in which the parameter can be accurately sensed at relatively inaccessible locations.

It is another object of the invention to provide an electric parameter monitoring system in which no electrical power need be supplied to the parameter sensing unit such as, for example, where the parameter is to be sensed in a rotating and inaccessible environment to which it is impractical to supply electrical power, in particular a rotating helicopter blade.

It is yet a further object of the invention to provide a remote parameter monitoring system of the type described, in which a passive element is employed as the parameter sensing element, and in which the system has the capability of distinguishing among a possible group of identically sensed parameters.

It is still a further object of the invention to provide a remote parameter monitoring system of the type described, in which all the electrically active circuits are located in a stationary environment, and the parameter sensing elements are all passive and housed in a non-stationary, e.g., rotating, environment.

It is a further object of the invention to provide a remote parameter sensing system in which parameter sensing units are placed in a plurality of spaced inaccessible locations, and a different indication is obtained at each remote indicating station corresponding to the inaccessible location at which the sensed parameter has changed its value beyond a predetermined threshold level.

It is a further specific object of the invention to provide a remote pressure-sensing and monitoring system for use in a vehicle such as a helicopter, or the like, in which the occurrence of a potentially dangerous pressure change, such as in a rotor blade can be quickly observed by the operator of the vehicle while the vehicle is still in operation.

To these ends, the present invention contemplates the provision of a passive parameter-sensing unit at a remote and inaccessible location, such as the rotor blades of a helicopter. The passive unit is electromagnetically coupled to an active unit located in a comparatively accessible location, and an indicator is coupled to the active unit. When the value of the sensed parameter changes above or below a predetermined threshold value, the passive sensing unit changes its state, and causes, through its coupling therewith, a corresponding change in the output of the active unit. The latter change is reflected by the indicator which thus provides an almost instantaneous indication of the predetermined change in the sensed parameter.

A plurality of such passive units may be provided at a corresponding plurality of remote locations. To enable the identification of the particular remote location at which the sensed parameter has varied beyond its threshold value, there may also be included in the system a corresponding plurality of active units and indicators respectively coupled to the individual passive sensor units. In accord with one of the embodiments of the invention as herein specifically described, each of the active units includes a transmitting unit, each of which is operative at a unique characteristic frequency, and each sensor unit is in the form of a potentially operative resonant circuit, each tuned to different frequencies corresponding to the tuned frequencies of the transmitting units.

That resonant circuit is in circuit connection with a parameter-sensitive switch, which, when the sensed parameter varies beyond the threshold level, is actuated to thereupon render its associated resonant circuit operative. This in turn, varies the output of the transmitting unit associated with the operative passive unit, and the output of the former is accordingly varied. This variation is effective to alter the state of the indicating unit associated with that transmitting unit, to thereby provide the desired indication of the varying parameter at the remote location.

The resonant circuit, when operative upon the closing of its associated parameter-sensitive switch, may be coupled through a suitable interface, such as a slip ring or a linear rotating transformer, to a fixed winding connected in common to the outputs of a plurality of transmitting units. The transmitting units are in turn each coupled through a suitable filter and detecting means to their associated indicators.

Upon the operation of one of the passive sensor units and the closing of its resonant circuit, the loading, and thus the output of the transmitting unit which is tuned to a corresponding frequency, varies in a stepwise manner. The characteristic frequency output of that transmitter is channelled by its associated filter to the corresponding indicator. Each indicator may provide one of two possible indications corresponding to a safe or non-safe (or GO/NO GO) condition at its associated remote location. Each indicator is normally in the safe (GO) condition until the operation of its associated sensing unit, at which time the condition of the indicator is altered to provide an unsafe (or NO GO) condition.

In another embodiment of the invention, the passive sensing unit is in the form of a microwave reflecting unit whose reflecting characteristics are varied upon the operation of the parameter sensing element. A microwave transmitter located remote from the reflecting units, projects a beam towards the passive reflectors and the reflected beam is sensed. The altered reflected signal resulting from the operation of the sensing element upon a predetermined deviation in the sensed parameter is analyzed to thereby produce an appropriate signal at the indicator.

To increase the flexiblity of the latter embodiment, a plurality of passive reflecting means may be provided at different remote locations, each having, upon the actuation of the associated sensing element a unique reflecting pattern to the incident microwave beam. That pattern is sensed and identified by suitable logic circuitry, whereby a corresponding indicator is actuated to indicate the location, or locations, at which the sensed parameter has varied beyond the threshold level.

To the accomplishment of the above and to such further objects as may hereinafter appear, the present invention relates to a remote monitoring and indicating system, substantially as defined in the appended claims and as described in the following specification taken together with the accompanying drawings, in which:

FIG. 1, is a schematic elevation of a helicopter illustrating the application of the remote parameter monitoring system according to one embodiment of the invention;

FIG. 3, is a view similar to FIG. 1, illustrating the application of a second embodiment of the invention;

Figure 2:
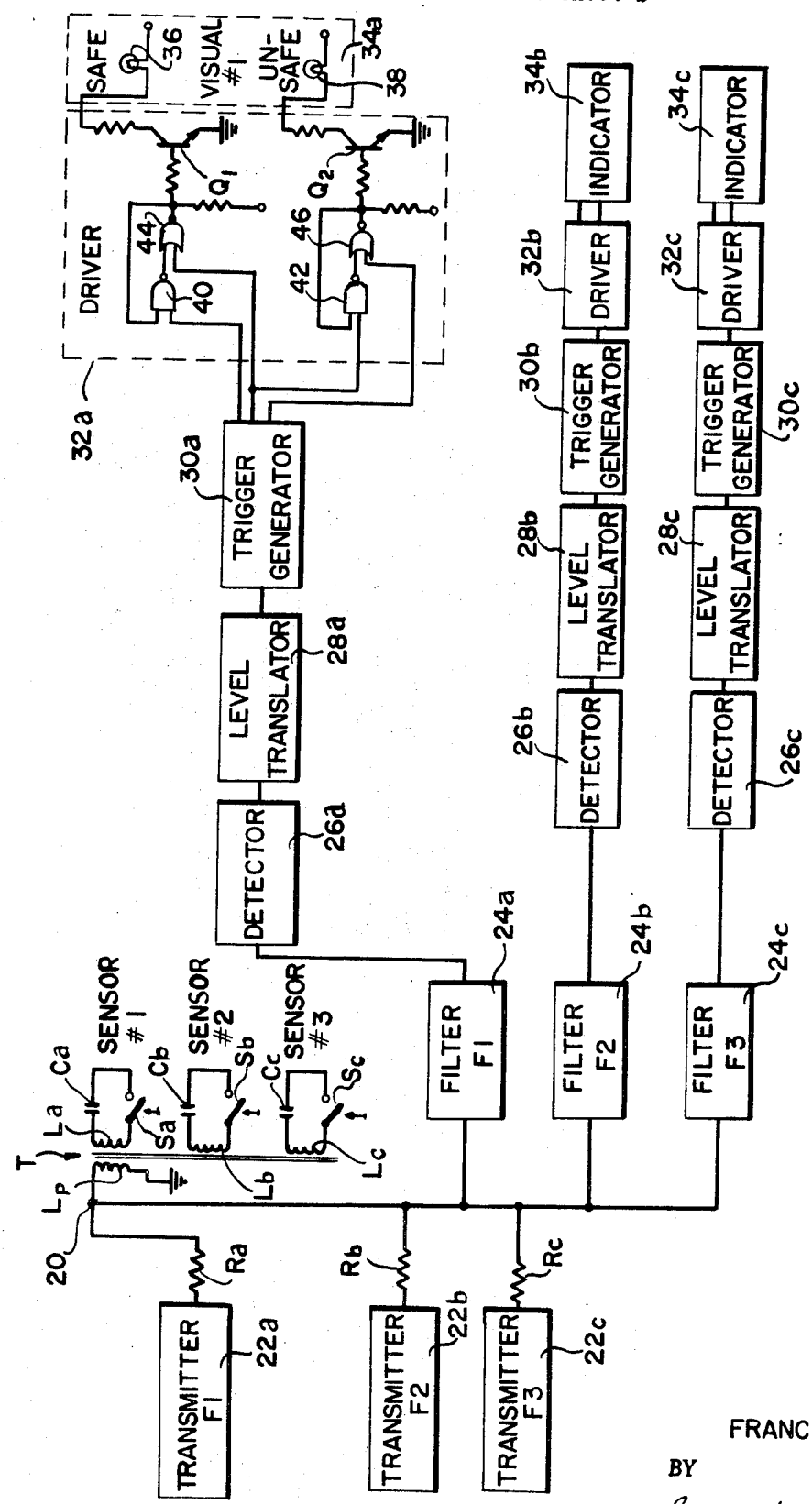
FIG. 2, is a schematic diagram of one embodiment of the invention as employed in FIG. 1.

FIGS. 4(a)–(c) illustrate possible different configurations of the passive microwave reflectors of the embodiment of FIG. 3;

FIGS. 5(a)–(c) illustrate the waveforms of the reflected signals obtained respectively from the passive reflectors of FIGS. 4(a)–(c); and FIG. 6, is a schematic block diagram of the sensing and indicating portions of the embodiment of FIG. 3.

Broadly considered, the remote monitoring system of the invention provides information at an indicator station concerning the state or level of a specified parameter at a remote, and perhaps, inaccessible environment to which the supplying of operating power is impractical or impossible. The invention is herein specifically described with respect to several embodiments thereof for use in the continuous monitoring of the internal pressure of rotating helicopter blades at a station remote from the blades, such as in the cockpit of the helicopter.

Referring now to FIG. 1, the system of the invention includes a passive parameter (e.g., pressure) sensitive element contained in a sensor unit 10, three of which, 10a–c, are respectively mounted on the blades 12a–c secured to the upper end of a rotor 14 of helicopter 16. The internal pressure of the blades is monitored at an indicating station located within the cockpit 18 of the helicopter 16. The sensing element is calibrated to operate when the sensed parameter reaches a predetermined threshold level, and the sensor units 10 are preferably mounted in a threaded port communicating with the sealed cavity of the blade, such as by the use of a single or double O-ring seal (not herein shown).

The parameter sensor units 10a–c are all electrically passive in nature, that is, they require no independent or external source of electrical power for their operation. As will be more completely described below, each of sensor units 10 are electromagnetically coupled to an active element, that is, an element that receives electrical power and generates energy when suitably actuated. The active elements (not seen in FIG. 1) are responsive to the passive sensor units 10, and are coupled to the cockpit indicator. When the sensed parameter, to wit, the pressure in one of the blades 12, falls below the predetermined threshold level, the passive unit 10 changes its state, as will be described, and causes the active element associated therewith to vary the level of its output supplied to its associated indicator. The latter thus provides an unambiguous indication in the form of a safe or unsafe (GO/NO GO) signal of the pressure within the blade.

As seen in FIG. 2, each of the sensor units 10a–c is there shown as further including a normally resonant circuit comprising a capacitor C and an inductance L connected in series with the sensing element in the form of a pressure-sensitive transducer or switch S, the latter being shown in its normally open condition. A pressure-sensitive switch suitable for use in this application is manufactured by the Mechmetals Corp. of Culver City, California, and identified by the manufacturer as the 500718 Series. When the pressure in one of the blades 12 falls below the threshold value due to, for example, a developing crack in that blade, the switch S in the sensor unit 10 housed in that blade closes in response to the pressure drop, and the resonant circuit in that sensor unit is thereby closed. Each sensor unit 10 thus defines a potentially operative resonant circuit tuned to a specific frequency as determined by the values of the inductance and capacitance in the individual sensor unit.

The resonant circuits in all sensor units 10 are inductively coupled to a fixed single winding $L_p$, which may be fixedly mounted in the hollow interior of rotor 16 in inductive coupling relation with the sensing unit inductances $L_a$–$L_c$. The inductance $L_a$–$L_c$ may thus be considered as defining the secondary windings of a rotary transformer T, of which winding $L_p$ serves as the common primary winding.

The ungrounded end of winding $L_p$ is coupled to a summing point 20 to which are also connected, through summing resistors $R_a$, $R_b$ and $R_c$, the outputs of signal transmitters 22a, 22b, and 22c. Transmitters 22 each contain an oscillator having a frequency-determining resonant circuit of which winding $L_p$ is a common component. As herein described, the resonant circuits of transmitters 22a–c, are respectively tuned to different frequencies F1, F2 and F3. The resonant frequencies of the tuned circuits of sensor units 10a–c, determined by the values of their inductance and capacitance, are established respectively to approximately the same values as oscillator frequencies F1–F3.

Point 20, and thus the outputs of transmitters 22, is coupled to the inputs of frequency-selective means in the form of active narrow-band pass filters 24a–c, the latter being respectively designated to pass only those signals centered about frequencies F1, F2 and F3. The outputs of filters 24a–c are respectively coupled to the inputs of detectors 26a–c, the outputs of which are in turn respectively coupled to the inputs of level translators 28a–c. The outputs of level translators 28a–c are respectively coupled to trigger generators 30a–c, each of which is in turn respectively coupled to the input of an indicator-driver 32a–c. The output of drivers 32a–c are respectively connected to indicators 34a–c.

Each driver 32 provides, according to its input level, one of two possible sets of complementary outputs, and each indicator 34 includes two indicators, here shown as lamps 36 and 38, respectively connected to the outputs of drivers 32. As will be described below, indicator 36 when energized by driver 32 indicates a safe pressure indication, and the energization of indicator 38 indicates an unsafe pressure condition i.e., a decrease in blade pressure below the specified threshold level in the associated blade 12.

In operation, when a crack appears in one of the blades, say blade 12a, and the pressure within the cavity of that blade decreases below the preset threshold level, the pressure-sensitive switch $S_a$ is closed and thus the resonant circuit in sensor unit 10a is closed. This changes the loading on the inductively coupled resonant circuit of the associated transmitter 22a, which in turn produces a change in the output level of that transmitter at its characteristic frequency F1. Filter 24a directs that signal only to detector 26a where the oscillator frequency component of the transmitter output signal is removed in a known manner.

The resultant output of detector 26a, which is in the form of a step-function signal, is applied to level inverter 28a in which the two levels of the detected stepfunction signal are shifted to levels more suitable for driving trigger generator 30, such as 0 and 5 volts. Trigger generator 30 provides complementary signals to the inputs of the latching driver 32a.

Each driver 32 comprises input NAND gates 40 and 42 respectively receiving at one of its inputs the true and complementary output signals from trigger 30. The outputs of gates 40 and 42 are respectively coupled to one input of NOR gates 44 and 46. The other inputs of NOR gates 44 and 46 are the complements of the signals applied to the inputs of NAND gates 40 and 42 respectively. The outputs of NOR gates 44 and 46 are fed back and applied respectively to the other input of NAND gates 40 and 42. The outputs of NOR gates 44 and 46 are in turn respectively connected to the bases of transistors Q1 and Q2 connected in groundedemitter configuration. The collectors of transistors Q1 and Q2 are respectively connected to the safe and unsafe indicators 36 and 38. Transistors Q1 and Q2 are biased as shown such that one of them is driven on and the other is driven off depending on the respective outputs of gates 44 and 46, which in turn correspond to the output of detector 26 as described.

The provision of the feedback path between the NOR gate outputs and the inputs to the NAND gate in driver 32 provides a latching action, such that a transition in the state of the complementary outputs of trigger generator 30 caused by a sufficiently large pressure drop in the associated blade, produces a permanent change in the operation of indicators 36 and 38, causing the former to be deenergized and the latter to be energized.

Thus, as will be appreciated, a pressure decrease in one of blades 12 produces a level transition in the output of that one of transmitters 20 which is tuned at the resonant frequency of the sensor unit resonant circuit formed upon the operation of the pressure switch housed in that blade. The level transition occurs at a frequency that is characteristic of or uniquely associated with, that blade and transmitter, and is thus steered by the filter tuned to that frequency to the corresponding driver and indicator. In the latter, the normally energized safe indicator will be turned off, while the normally deenergized indicator 38 will become lit. As a result, both the existence of blade damage and the identity of the damaged blade are both simultaneously and unambiguously obtained in the cockpit. The indicators associated with the undamaged blades will remain in their safe condition in which only indicator 36 is energized.

In the embodiment of FIG 2, three different monitoring channels are provided, each operating at a different characteristic frequency. If it is desired to only sense the presence of a fault rather than to identify its location, only a single transmitter and indicator channel may be employed which is inductively coupled as shown to one or more sensor units. In a system modified along these lines, a fault in any one of the blades would produce an unsafe indication. The location of the fault could be made by conventional means once the aircraft was grounded.

It is of significance that in the system of FIG. 2 all of the electrically active circuits, that is, those circuits included in the channel from transmitters 22 to indicators 36, which require operating power, are all located in a stationary, i.e., non-rotating environment of the helicopter, and may thus all conveniently be packaged along with the necessary power supply in a single unit located in the cockpit. Only the sensor units 10, which contain only passive elements requiring no operating power, to wit inductance L, capacitance C, and pressure-switch S, are housed in the inaccessible rotating blades.

An alternative embodiment of the invention illustrated in FIGS. 3–6, is also described for use in detecting the loss of pressure in blades 12a–c rotatably mounted on a rotor 14 of a helicopter 16. In this embodiment the passive elements mounted on the blades are in the form of microwave reflectors 50a–c, operating in conjunction with a pressure-sensitive switch in a manner to be described. A microwave transmitter 52 is carried on the upper section of fuselage 54 of helicopter 16 and transmits a beam of microwave energy 56 which is offset from the axis of rotation of rotor 14, such that beam 56 is periodically and sequentially intercepted by the rotating blades when the helicopter is in flight.

Reflector elements 50a–c, when their associated pressure-sensitive unit operates upon sensing a predetermined pressure level, presents a unique reflecting pattern to the microwave energy incident thereon. In the specific configuration of the reflector elements herein shown, elements 50 are in the form of a reflecting surface 58 each having a different number of openings 60 formed therein. As seen in FIGS. 4a–c elements 50a–c respectively have one, two and three aligned openings formed therein. A channel 62 extends beneath surface 58 and communicates with the lower ends of openings 60.

Beneath channel 62 are disposed a corresponding number of microwave lossy members 64 made of a lossy material such as carbon. That is, element 50a contains one lossy member, while element 50b and 50c respectively have two and three lossy members. Members 64 are in respective registration with the openings 60 formed in their associated reflecting element, and a reflecting plate 66 is positioned within channel 62 and is transversely movable therein. To this end plate 66 is coupled by a rod 68 to a pressure-sensitive trigger 70.

In operation, when the pressure in each of blades 12a–12c is above the minimum safe level, all of the pressure triggers 70 are inoperative and reflecting plates 66 are all in their inoperative positions as shown in the solid line position in FIG. 4, in which they are interposed between the openings 60 in reflecting surface 58 and the lossy members 64. The blade surface thus defined is completely reflective of microwave energy and the signal received at a receiver 72 located near transmitter 52 is a uniform signal each time one of the blades passes over the microwave beam.

However, when the pressure in one of the blades 12 falls below the safe permissible level, the pressure trigger 70 in that blade is operated causing plate 66 to be moved away from its solid line position to its broken line position shown in FIG. 4a. In that position of the pressure plate, the plate no longer covers the lossy members 64 which are now exposed through openings 60 in surface 58 to the incident microwave energy.

The reflected pattern from the faulty blade thus exhibits a null at the position of the opening in the blade surface where the energy is absorbed rather than reflected by the exposed lossy members. The reflected energy patterns for each of the blades in the operative condition of the pressure trigger is shown in FIG 5a–c, showing the single, double and triple nulls resulting from the presentation of the lossy material to the incident microwave beam of elements 50a, b and c, respectively.

The reflected signals are respectively received and detected in receiver 72 and a microwave detector 74 coupled to the output of the receiver (FIG. 6). The output of the latter is applied to a counter and logic circuit 76 which counts the number of null signals present in a given time period, i.e., the time required for one of elements 50 to completely pass over the microwave beam.

The count produced by the detected signals is processed in a logic circuit the design of which is well within the skill of one in the field of logic design. For a count 1 condition (corresponding to a reflection from element 50a upon a fault in blade 12a) a pulse is applied to trigger 82a which applies complementary signals to indicator 84a to cause its unsafe indicator to be energized much in the manner described above with reference to the embodiment of FIG. 2. Similarly, a count 2 or count 3 signal obtained in circuit 80 causes a drive signal to be applied to trigger 82b or 82c. The latter, in turn are respectively connected to indicators 84b and 84c and cause their associated unsafe indicators to be appropriately energized to thereby provide an unambiguous indication and identification of a damaged blade.

By an alternative use of the basic system of FIG. 2, an unsafe indication may be obtained whenever the pressure in one of the tires in a multiple-tire arrangement, such as that commonly found in a truck or the like, decreases to less than a predetermined safe level. The prompt detection and location of the faulty tire prevents the destruction of the other tires and thus reduces the likelihood of an accident.

In a truck installation, the sensor unit is housed in conjunction with the tire air valve, which could be readily modified to receive the senor unit while still preventing the loss of air from the tire. The stationary winding of the coupling rotary transformer is located in the non-rotating hub or brake assembly of the tire being monitored. The operation and manner of operation of the truck mounted, parameter monitoring system is similar to that described above for use in the helicopter, and is thus not further described herein.

The present invention thus provides an effective and reliable system for monitoring a physical parameter at a remote and inaccessible location, and for indicating the presence of a fault at the remote location whenever the monitored parameter falls above or below a specified level. Significantly, all the active components of the system are located in a fixed and accessible location to which electrical power could be supplied with relative ease, while the sensor unit located in the inaccessible location is completely passive, that is, it requires no electrical power for its operation.

Also significant in the system of the invention is its capability, by means of assigning a characteristic frequency to each senor unit, to indicate the particular remote location at which the sensed parameter has reached a fault level.

While the present invention has been herein primarily specifically described with reference to the monitoring of blade pressure in a helicopter, it could clearly also be used in other applications such as the truck herein mentioned, and in installations such as factories, and in rotating machinery such as dynamos, generators and the like, and for monitoring other parameters such as temperature, acceleration, weight and fluid level, merely by modifying the passive parameter-sensing unit and the means for coupling the passive and active units.

Thus, while only several embodiments of the invention have been herein specifically described, it will be apparent that modifications may be made therein all without departing from the spirit and scope of the invention.

I claim:

1. A system for monitoring a parameter at a plurality of spaced locations, said system comprising a plurality of parameter responsive switching means respectively located at said locations and operable in response to a predetermined change of said parameter, a plurality of electrically passive, normally inoperative resonant circuits respectively coupled to said parameter-sensitive means, said parameter sensitive switching means being effective when operated to render operative a corresponding one of said resonant circuits, a plurality of electrically active sources of signals at different frequencies located remote from said passive resonant circuits, a single winding coupled to the outputs of said plurality of signal sources and inductively coupled to said plurality of passive resonant circuits and effective upon the operation of one of said parameter-sensitive switching means to produce an electrical signal at one of said frequencies, said one of said frequencies being uniquely associated with said one of said parameter-sensitive means, a corresponding plurality of indicating means located remote from said passive resonant circuits, and a corresponding plurality of means having an input coupled to said single winding and an output respectively coupled to said indicating means for selectively applying said unique frequencies signal to a corresponding one of said plurality of indicating means.

2. The system of claim 1, in which said passive resonant circuits each comprise an inductive winding inductively coupled to said single winding.

3. The system of claim 2, in which each of said signal sources includes a tuned circuit, said transformer winding being a component of the tuned circuit of each of said signal sources.

4. The system of claim 1, in which said signal applying means includes frequency-sensitive means respectively operatively interposed between said signal sources and said plurality of indicating means.

5. The system of claim 4, in which the outputs of each of said signal sources are coupled to a common point, and the inputs of said frequency-sensitive means are all coupled to said common point.

6. The system of claim 4, in which each of said indicating means comprises a first element operative only when the corresponding one of said parameter-sensitive means is in an operative condition, and a second element operative only when the corresponding one of said parameter-sensitive means is in its inoperative condition.

7. The system of claim 6, further comprising means operatively interposed between said signal producing means and said indicating means for selectively applying a control signal to one of said indicator elements in response to the condition of the associated one of said parameter-sensitive means.

8. In an aircraft having a plurality of blades rotatably mounted on a rotor, means on said aircraft for directing a beam of electromagnetic energy along a direction offset from the axis of the rotor so that when said blades are rotated said beam is sequentially and periodically interrupted by said blades, passive energy reflective means carried by said blades, switching means carried by said blades and operable in response to a change in the internal pressure of one of said blades for altering the reflective characteristics of the passive reflecting means on said one of said blades, and means located in the cockpit of said aircraft for sensing the change in the reflective characteristics of said passive reflective means, to thereby provide a warning indication.

9. The apparatus of claim 8, in which said passive reflective means each provide a different reflected signal to said sensing means, and further comprising means coupled to said sensing means for distinguishing the reflected signal, and a plurality of indicating means coupled to said signal-distinguishing means, one of said indicating means being made operative upon the operation of a corresponding one of said switch means.

10. A system for detecting and indicating a predetermined change in a specified parameter at a plurality of remote locations comprising a plurality of electrically passive, normally inoperative resonant circuits resonant at a different frequency when operative and located respectively at said remote locations, a plurality of parameter-sensing switch means respectively coupled to said resonant circuits, said switch means being normally in a first inoperative state and being placed in a second operative state in response to said predetermined change in said parameter at one of said remote locations to render the one of said resonant circuits at said one remote location operative, a plurality of electrically active transmitting means producing signals at different frequencies and spaced from said remote locations and from said passive resonant circuits, said different frequencies being respectively approximately equal to the resonant frequencies of said resonant circuits, means for respectively inductively coupling said transmitting means to said passive resonant circuits, means coupled to said passive resonant circuits through said inductive coupling means for producing a fault signal upon the operation of said one of said passive resonant circuits, and indicating means coupled to said fault signal producing means and operable in response to said fault signal for providing an indication whenever said parameter changes by at least said predetermined amount at said one remote location.

11. The system of claim 10, in which said indicating means comprises a corresponding plurality of indicators, and further comprising a corresponding plurality of frequency-sensitive means respectively operatively interposed between said transmitters and said plurality of indicators.

* * * * *